(12) United States Patent
Greve et al.

(10) Patent No.: US 7,453,581 B2
(45) Date of Patent: Nov. 18, 2008

(54) METHOD OF AND APPARATUS FOR DETERMINING FOCUS OF AN IMAGING SYSTEM

(75) Inventors: Peter Ferdinand Greve, Eindhoven (NL); Albert Bijlsma, Eindhoven (NL); Willem Jannis Rosier, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 133 days.

(21) Appl. No.: 10/578,652

(22) PCT Filed: Nov. 2, 2004

(86) PCT No.: PCT/IB2004/052262

§ 371 (c)(1),
(2), (4) Date: May 9, 2006

(87) PCT Pub. No.: WO2005/047846

PCT Pub. Date: May 26, 2005

(65) Prior Publication Data

US 2007/0058159 A1    Mar. 15, 2007

(30) Foreign Application Priority Data

Nov. 14, 2003 (EP) .................. 03104195

(51) Int. Cl.
    *G01B 11/24* (2006.01)
(52) U.S. Cl. ...................................... 356/609
(58) Field of Classification Search ............. 356/609
    See application file for complete search history.

(56) References Cited

U.S. PATENT DOCUMENTS

| | | | |
|---|---|---|---|
| 4,641,964 A * | 2/1987 | Mitani et al. ............. 356/125 |
| 4,767,215 A * | 8/1988 | Borodovsky ............. 356/124 |
| 5,844,670 A * | 12/1998 | Morita et al. ............ 356/124 |
| 6,117,193 A * | 9/2000 | Glenn .................. 29/25.01 |
| 6,195,159 B1 * | 2/2001 | MacDonald et al. ...... 356/123 |
| 6,760,096 B2 * | 7/2004 | Kitabayashi et al. ...... 356/124 |
| 7,071,966 B2 * | 7/2006 | Lu et al. ................ 348/188 |
| 7,158,170 B2 * | 1/2007 | Gustavsson et al. ....... 348/187 |
| 2003/0227615 A1 * | 12/2003 | Montgomery et al. ... 356/139.03 |

* cited by examiner

*Primary Examiner*—Tarifur R. Chowdhury
*Assistant Examiner*—Isiaka O Akanbi

(57) ABSTRACT

The focus of an optical system (20) can be determined in a reliable and accurate way by arranging a first and second test object (62,64) having a periodic structure at different sides of the focal plane (66) of the optical system and determining the difference in modulation depth of the images formed on different areas (32,34) of a radiation-sensitive detection system (30).

6 Claims, 4 Drawing Sheets

METHOD OF AND APPARATUS FOR DETERMINING FOCUS OF AN IMAGING SYSTEM

The invention relates to a method of determining focus of an optical system, which method comprises the steps of:
arranging the optical system between an illumination system and a radiation-sensitive detection system;
arranging a test object between the illumination system and the optical system;
imaging the test object by means of the optical system on the detection system, and
establishing the position of the focal plane from the modulation depth of the test object image.

The invention also relates to an apparatus for carrying out the method

Focus of an imaging system having an optical axis is understood to mean the axial position of the focal plane of the imaging system. This system may be a composed system comprising a number of lens elements and/or mirror elements, which elements together image an object at a required axial position. The imaging system may also be a single or mirror element. Focus detection is widely used in the field of optics, for example for determining the focal plane of a single or composed lens or mirror or during manufacture of an optical apparatus comprising an optical imaging system to determine whether the focal plane of this system is at the required position within the apparatus.

Several methods for determining best focus are known in the art, such as a method that uses axially shifted (test) objects or axially displaced sensors and compares the sensor output signals to decide where the focal plane of the imaging system is. U.S. Pat. No. 6,195,159 describes a lens testing system that uses this method.

The method that best approaches the method of the present invention is a dynamic method that uses a single test object. This object is "scanned through focus", which means that the object is moved through an axial range, which extends from a position at one side to a position at the other side of the location of optimum focus. Alternatively, the imaging system itself, or part of it can be scanned. During scanning, the contrast or sharpness of this image is determined from the signals supplied by a sensor, which receives an image of the test object, and the contrast value is stored. It is determined for which positions of the moving object or the moving imaging system images are obtained which have the same unsharpness. The position midway these two positions is the position of best focus.

Since the modulation depth, which, in case the object contains light and dark areas, is a measure for the contrast, as a function of the positions shows a small variation in the best focus range, i.e. when approaching best focus, and even no variation in best focus, the sensitivity of the known method is low. This results in a low measuring precision. It is difficult to estimate the amount of defocus in the best focus range. Moreover, the sign of a detected focus error; i.e. the actual focus is at one side or at the other side of best focus, can not be determined without moving the object or the imaging system so far out of focus that sufficient variation of the modulation can be observed. Consequently the precise amount and sign, of defocus cannot be determined for a fixed optical system.

It is an object of the present invention to provide a method as defined in the opening paragraph, which method allows determining not only the amount of focus deviation with high accuracy, but also the sign of such deviation, is a static method and uses a minimum number of optical elements. This method is characterized in that the step of arranging a test object comprises arranging a first test object between the illumination system and the expected focal plane of the optical system and a second test object between this plane and the optical system system, whereby the first and second test objects are arranged at different locations with respect to the optical axis of the optical system and in that the step of establishing focus comprises determining the modulation depth of each of the two test object images and subtracting the obtained modulation depth values from each other to obtain a difference value, which represents the position of focus with respect to the positions of the two test objects.

The invention is based on the insight that the through-focus modulation $M_{tf}$ curves associated with two test objects having the same structure, which objects are arranged, respectively before and behind the focal plane of an imaging system will be shifted with respect to each other. An $M_{tf}$ curve shows the modulation in an image of an object as a function of the axial position of this object with respect to the best focus plane of the imaging system. The MTF, or modulation transfer function is a well-known parameter in optics. Usually the contrast of an image formed by an imaging system is given in terms of grey value modulation in the image. Currently, the modulation transfer of an imaging system is determined by means of an object that shows a periodic structure. The grey value modulation for a given periodicity is called the modulation transfer for that periodicity. In this description $M_{tf}$ is understood to mean the $M_{tf}$ associated with an object having a given periodicity. The said two through-focus modulation curves have a Gaussian shape. The width of an Mtf curve depends among others, on the periodicity in the object and the distance between the tow objects. Currently this width is expressed in: full width at half maximum (FWHM). If the curves of said two sub-objects are close to each other, i.e the distance between their tops is smaller than about 1.5 times the FWHM subtraction the curves from each results in a so-called S-curve will be obtained, which shows a substantially linear slope around zero. This zero in the S-curve represents the best focus of the imaging system.

In the static measuring method of the present invention, wherein no trough-focus scanning is used, for a given focus position two modulation values, one for each object are obtained, and thus one difference value having a magnitude and sign (+ or −) which is unique for that focus position is obtained. This difference value indicates the amount and sign of correction that is needed to obtain best focus. For best focus the modulations associated with the two objects have the same value, which is considerably different from, for example 0.5 to 0.8 of the maximum value, that was used in the above-discussed known method. The static differential method of the invention gives for every defocus the precise amount and sign of the defocus. For a high quality optical system the method allows measuring the amount of defocus with a sensitivity of the order of 1% of the focus depth of the optical system. The focus depth, or focal range is the amount of defocus that is acceptable, i.e. for which an acceptable image can be obtained.

Preferably the method is further characterized in that focus is determined at different points in the field of view of the imaging system.

In this way, average defocus across the field of view and parameters of the imaging system, like field curvature and the shape thereof can be determined and the single-frequency modulation at different points in the field can be estimated.

The invention also relates to an apparatus for carrying out the method. This apparatus, which comprises successively a radiation source for supplying an illumination beam, a test object, a location for the optical system to be measured, a radiation-sensitive detection system and processing means for processing signals from the detection system, is characterized in that the test object comprises two sub-objects, which are arranged at different sides of the expected best focus of the optical system and at different locations with respect to the axis of the apparatus, in that the radiation-sensitive detection system comprises separate detection areas for the images of the sub-objects and in that the processing means comprises means for calculating the difference in contrast of the images.

An embodiment of this apparatus is characterized in that the sub-objects are gratings.

Optical gratings are very suitable as test objects for measuring properties of optical systems.

These and other aspects of the invention are apparent from and will be elucidated, by way of non-limitative example, with reference to the embodiments described hereinafter. In the drawings.

Figure 1:
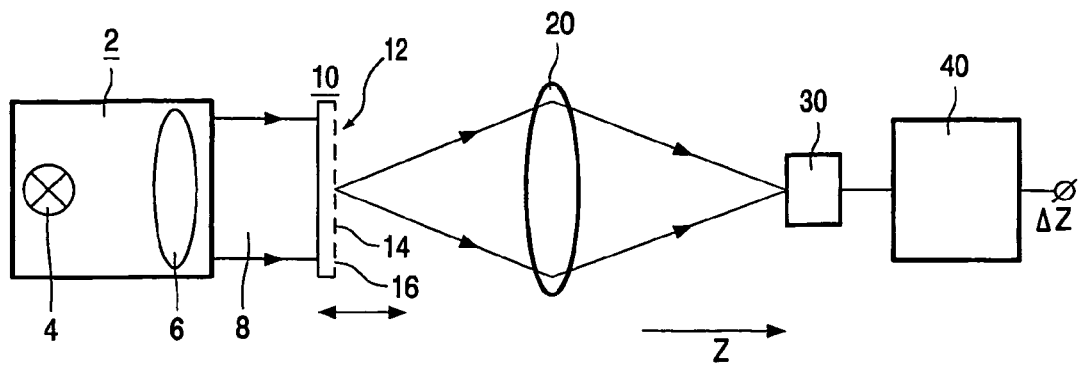
FIG. 1 shows a diagram of a conventional apparatus for determining focus of an imaging system.

FIG. 1 shows a best-focus detection apparatus 1. This apparatus comprises an illumination system 2 that supplies an illumination beam 8. The illumination system comprises a radiation source 4 and may be of any type; for example it comprises beam-shaping optics, schematically shown as a single lens 6. The apparatus further comprises a test object 10, which comprises a grating structure 12 consisting of grating strips 14 and intermediate strips 14. The grating structure is supported by a transparent substrate 16. The grating may be a transmission grating, or black-and-white grating, i.e. a grating having transparent grating strips and non-transparent (absorbing or reflective) intermediate strips. The grating may also be a phase grating, i.e. the grating strips are situated at a first level and the intermediate strips are situated at a second level with respect to the substrate surface. The grating is illuminated by the illumination beam 8.

An imaging system 20 to be measured is inserted in a holder (not shown) in the path of the radiation passing through the test object. This imaging system is represented by a single lens, but it may also be a composed imaging system comprising a number of lenses. During measurement the system 20 images the test object on a radiation-sensitive detection system 30, whereby each point of the grating structure is conjugated with a separate point of the detection system. This is shown in FIG. 1 by means of a sub-beam 18 starting from a point of the grating structure. The radiation-sensitive detection system may be a sensor of a camera, such as CCD sensor or a CMOS sensor, well known in the art. The output of the sensor is connected with an electronic processing unit 40, which is also well known.

The sharpness of, or contrast in, the image formed on the sensor depends on the focus, i.e. the axial (Z-) position of the test object with respect to the position of the best focus object plane of the imaging system. For an image of an object consisting of a pattern of dark and bright lines, such as a grating, the contrast is expressed in terms of intensity-, or grey value-, modulation. This modulation M is dependent on the periodicity, or spatial frequency in the imaged object. The image of an object having only one spatial frequency sf comprises only one modulation $M_{sf}$. The well known MTF (modulation transfer function) represents the modulation as a function of the spatial frequency, which is usually expressed in lines per mm (lpmm). The variation of the modulation M as a function of focus may be called through-focus modulation $M_{tf}$.

Figure 2:
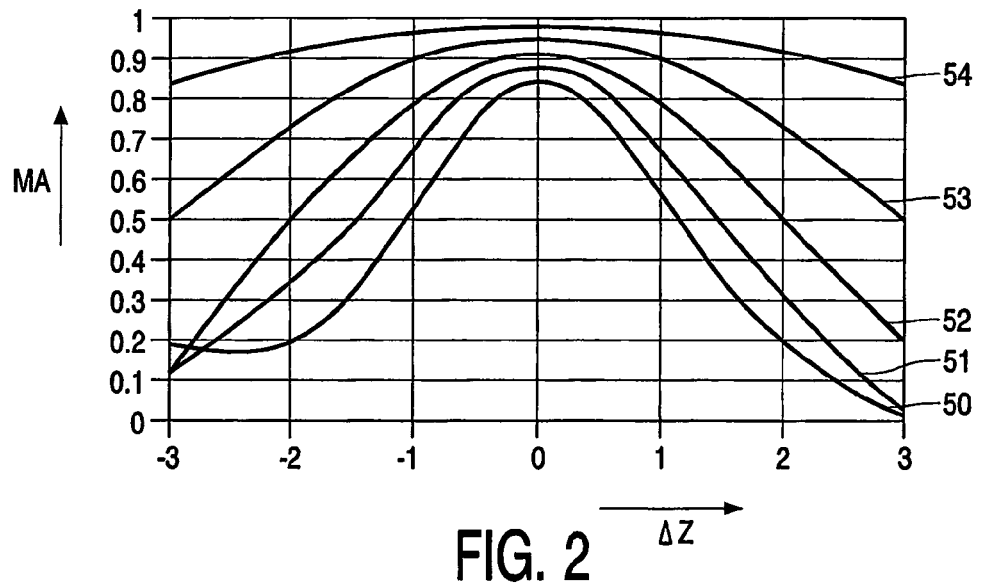
FIG. 2 shows through-focus modulation curves.

FIG. 2 shows an example of such $M_{tf}$ for an object having a spatial frequency of 10 lpmm (curve 50). The defocus $\Delta z$ is plotted along the horizontal axis (in mm) and the modulation amplitude MA is plotted along the vertical axis. To show the modulation dependency of the spatial frequency in the object, also curves 51, 52, 53 and 54 for spatial frequencies of 8 lpmm, 6 lpmm, 4 lpmm and 2 lpmm, respectively are given.

It is generally known in optics how to determine the modulation in an image of an object by means of an optical sensor, a signal-processing device coupled to the sensor and processing software. In the ideal i.e. $\Delta z$ is zero or the object is in the best focus plane of the imaging system, the modulation is maximum.

In conventional methods this criterion is used to determine best focus of an imaging system try to obtain maximum modulation in the image. However, this "maximum modulation" method shows the following disadvantages.

The variation of the modulation M as a function of $\Delta z$ is smallest (actually zero) at the top of the curve, i.e. for $\Delta z$ is zero. The method is thus relatively insensitive at the critical point.

Close to the top it is difficult to determine from the modulation value alone how to proceed to arrive at the top. As an additional step wobbling, or scanning, through focus is used in practice to get information about which direction to go. As discussed herein before, it is possible to search for two positions (defocus settings) which provide the same (non-) sharpness to estimate the best focus. The best focus position is midway these two positions. However, the result thus obtained is ambiguous in the area near the top, because non-accurate actuators or interference of the test-object image with the sensor pixel pattern, which results in aliasing, may have disturbing effects.

It will not be possible to find the actual focus from the modulation value if it is not possible to change focus to find the optimum modulation value. This means that it is not possible to determine focus of a finished imaging system.

In some applications of imaging systems it is required to determine tilt of the object plane. This requires precise focus measurement at the edges of the image field It is difficult to realise such a measurement by means of the conventional method.

Figure 3:
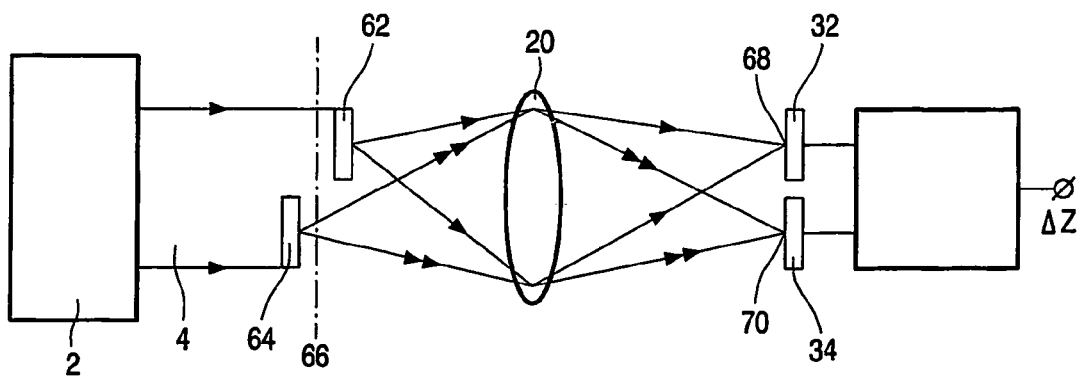
FIG. 3 shows an embodiment of an apparatus according to the invention for determining focus of an imaging system.

The present invention provides a method, which allows for determining the actual focus of an imaging system and does not need movement of a component. FIG. 3 shows a diagram of an apparatus for performing this method. The components of this apparatus, which are the same as those in the apparatus of FIG. 1, are denoted by the same reference numerals. According the invention, two (sub-) test gratings 62 and 64 are arranged at different sides of the optical axis Z. These gratings are positioned at different axial distance from the imaging system 20, such that one of the sub-gratings is situated before the best focus plane 66 of the imaging system and the other sub-grating is situated behind the plane 66. The imaging system 20 forms images 68 and 70 of the sub-gratings 62 and 64, respectively at different areas of the detection system, or sensor 40. These sensor areas are separately and simultaneously read out. The imaging system may be the objective lens of a camera and is the arranged close to the radiation-sensitive detection system in the form of a CCD sensor or a CMOS sensor.

Figure 4:
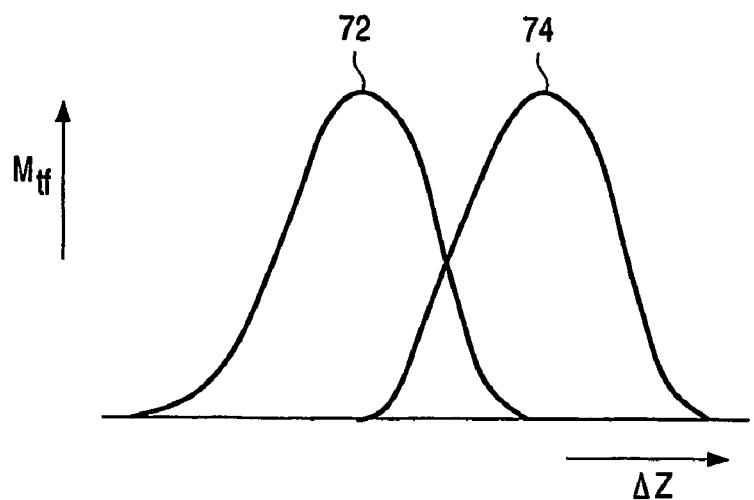
FIG. 4 shows the through-focus modulations curves obtained with this apparatus.
Figure 5:
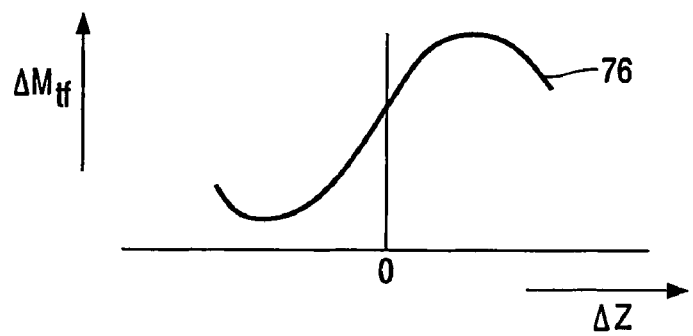
FIG. 5 shows a curve which represents the difference between these curves.

Since the sub-gratings 62 and 64 are at different distances to the imaging system 20, the $M_{tf}$ curves 72 and 74 associated with these gratings would be shifted relative to each other as shown in FIG. 4. In the processor 40 the measured M values associated with the sub-gratings are compared with each other, i.e. they are subtracted from each other. In terms of $M_{tf}$ curves, this means that the curves 72 and 74 would be subtracted from each other, which would result in a differential $\Delta M_{tf}$ curve 76 shown in FIG. 5. This curve, which can be called S-curve, shows s steep sloop around the point $\Delta z=0$, i.e. around the best focus point. Thus, it becomes possible to determine with great accuracy the position of focus of the imaging system. Each value $\Delta M$ of the difference between the measured M values for the sub-gratings now represents one position of the focus of the imaging system. Both the amount and the sign of a deviation of the actual focus and the required focus can be determined fast and accurately.

Figure 6:
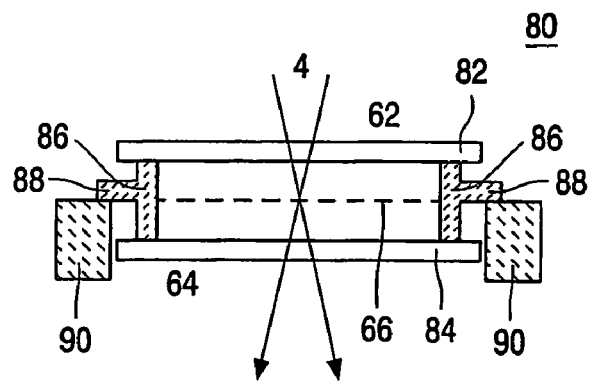
FIG. 6 shows an embodiment of a test object for use with the method according to the invention.

The sub-gratings, or other test sub-objects may be separate elements. preferably, they are integrated in one component 80 as shown in FIG. 6. This component comprises two transparent, for example glass, plates 82 and 84, which are separated by spacers 86 provided with ribs 88 to be sustained by a holder 90. The right side of plate 82 comprises the first sub-grating 62 and the left side of plate 84 comprises the second sub-grating 64. The plates may be coated with a chromium layer and the grating strips may be etched in this layer. The member 80 is arranged at such axial position in the measuring apparatus that the best focus plane 66 is between the two sub-gratings, in the ideal case midway these sub-gratings. If a material having sufficient optical quality is chosen for the grating plate and thus this plate can be made sufficient thick, the sub gratings can be arranged at opposite sides of one plate.

Figure 7:
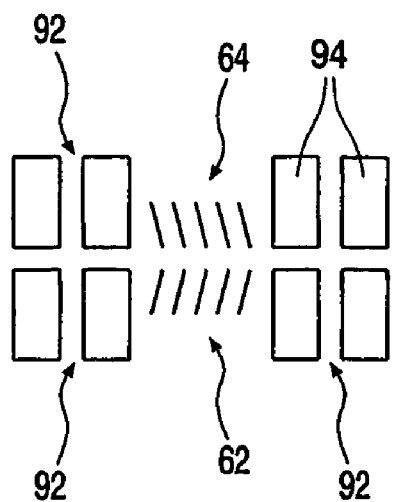
FIG. 7 shows an embodiment of a grating structure set for such a test object.

FIG. 7 shows a top view of a practical embodiment of the test grating structure. Reference numerals 62 and 64 denote the upper sub grating and the lower sub grating, respectively. The gratings strips may skewed at a small angle, for example of the order of 8° to prevent formation of a Moiré pattern, which may result from interference between the grating structure and the pixel structure of the sensor. The spatial frequency of the grating structure is, for example of the order of 12 lines per mm. Generally, the magnification for both gratings will be slightly different, because the gratings are arranged at different distances from the imaging system. However, it is preferred that the images of the gratings show the same spatial frequency. This can be obtained by using gratings which have slightly different spatial frequencies so that the difference in magnification can be compensated. As a reference for the modulation measurement at each side of a grating a coarser grating structure 92 having gratings strips 94 at a spatial frequency of, for example 2 lines per mm may be arranged. In terms of the graphs of FIG. 3, the coarse grating structure provides a modulation depth value 1.

Figure 8:
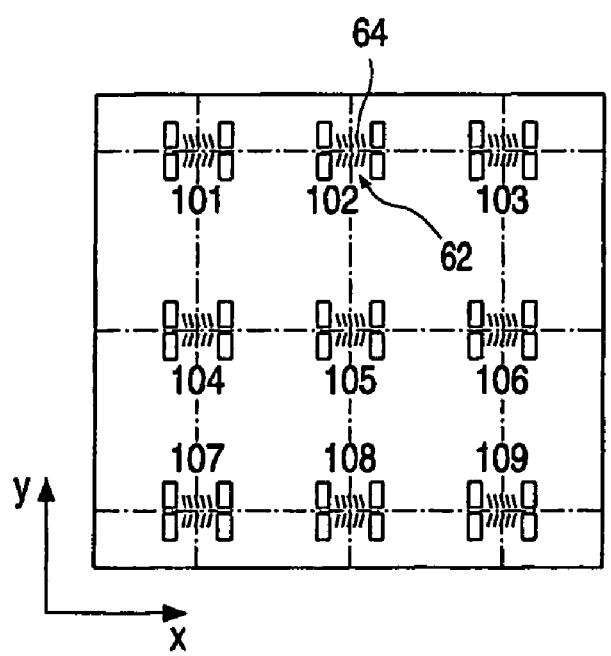
FIG. 8 shows a test object with a plurality of grating structure sets.

Focus can be determined at several positions of the field of view of the imaging system being measured. This allows measuring more parameters of the imaging system such as tilt and field curvature. FIG. 8 shows an embodiment of a grating structure which is suitable for performing such measurements. This grating structure comprises nine sets of each an upper sub-grating 62 and a lower sub-grating 64 and coarser reference grating structure at both sides of these sub-gratings. For measuring tilt between the optical axis of the imaging system and the sensor plane around the Y-axis, for example the sets 101,102, 103 and 107, 108, 109 can be used. The Y-tilt can be determined form the average difference between the focus found for these sets and the distance between these sets. From the average difference between the focus found for, for example the sets 101, 104, 107 and 103, 106, 109 and the distance between these sets, the tilt around the X-axis can be found.

For determining field curvature in the X-direction, for example sets 102, 105 and 108 may be used. First the tilt along the X-axis is determined as described herein above. Then this tilt is set to zero by processing software, which results in a new focus for sets 102, 105, 108. Finally a curve is fitted through the (new) focus of the sets 102, 105, and 108. In a similar way the field curvature in the Y-direction can be determined by means of three sets of sub-gratings.

The invention can be used for determining focus of different types of optical systems for the purpose of characterising the optical system or adapt the positional setting in an apparatus wherein the optical system has to be included. One example of such a system is the objective lens of a camera. For small and simple cameras, such as used in mobile phones or other hand-held apparatus the objective lens should image sufficiently sharp also objects which are at a large distance from the camera, in optical terms are in infinity. Such an objective lens should have a finite conjugate objective lens with a very large depth of focus. For such an objective lens an extra measure is needed to achieve that the test grating which is most remote from the camera is out of focus. To that end an additional lens is arranged between the objective lens and the two test gratings.

Figure 9:
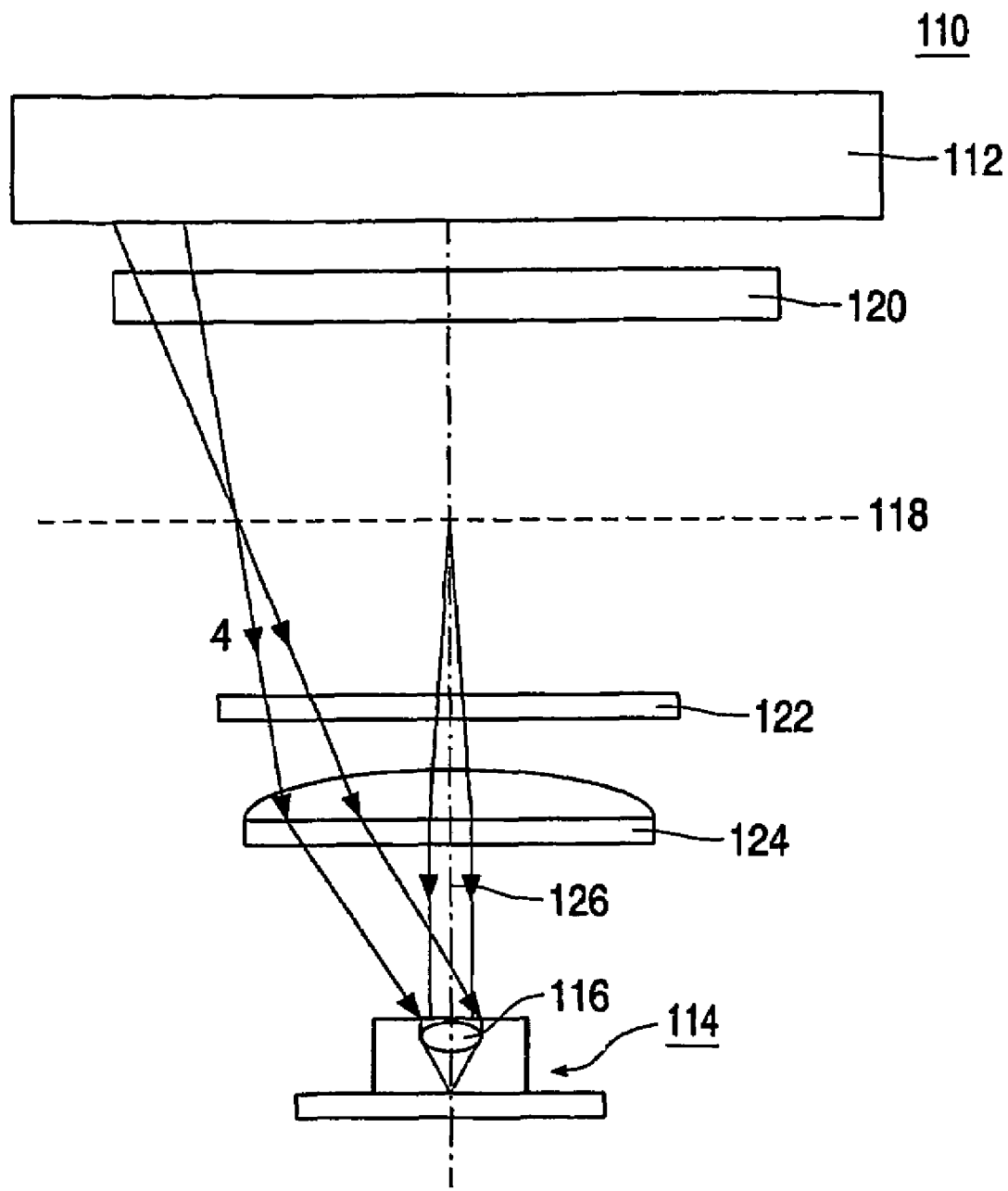
FIG. 9 shows an embodiment of the apparatus according to the invention comprising an additional lens.

FIG. 9 shows an embodiment of the apparatus with such an additional lens 124. In this figure, 112 is the illumination system, for example a background illumination system. 114 is the camera and 116 is the objective lens the focus of which is to be determined. 120 and 122 are sub-gratings arranged at different sides of the best focus plane. For an objective lens having a large depth of focus the sub-grating 120 is in focus. To bring this sub-grating out of focus, as required for the present method, a lens 124 is arranged between the sub-grating 122 and the objective lens 116. By means of this lens the best focus plane 118 is shifted towards the objective lens 116 so that the sub-grating 120 becomes situated at a convenient distance from the focal plane. In this way the present method can also be used for an imaging system having a large depth of focus. 126 is a sub-beam from one point of the best focus plane and received by the objective lens.

The present method can be carried out not only with gratings, but also with other test objects, which have a periodic structure.

The invention claimed is:

1. A method of determining the focus of an optical system, which method comprises the steps of:
arranging the optical system between an illumination system and a radiation-sensitive detection system;
arranging a test object between the illumination system and the optical system;
imaging the test object by means of the optical system on the detection system, and
establishing the position of the focal plane from the modulation depth of the test object image, characterized in that the step of arranging a test object comprises arranging a first test object between the illumination system and the expected focal plane of the optical system and a second test object between this plane and the optical system, whereby the first and second test objects are arranged at different locations with respect to the optical axis of the optical system, and in that the step of establishing focus comprises determining the modulation depth of each of the two test object images and subtracting the obtained modulation depth values from each other to obtain a differnce value, which represents the position of focus with respect to the positions of the two test objects.

2. A method as claimed in claim 1, characterized in that focus is determined at different points in the field of view of the imaging system.

3. An apparatus for determining focus of an optical system, wherein the apparatus comprises successively a radiation source for supplying an illumination beam, test objects, a location for the optical system to be measured, a radiation-sensitive detection system and processing means for processing signals from the detection system, characterized in that the test objects comprise a first test object between an illumination system and an expected focal plane of the optical system and a second test object between the expected focal plane and the optical system, whereby the first and second test objects are arranged at different locations with respect to the optical axis of the optical system, and wherein focus is established by determining modulation depth values of each of two test object images of the first and second test objects and subtracing the obtained modulation depth values from each other to obtain a difference value which represents a position of focus with respect to positions of the first and second test objects.

4. An apparatus as claimed in claim 3, characterized in that the sub-objects are gratings.

5. An apparatus as claimed in claim 4, characterized in that the gratings are arranged at the front side and the rear side, respectively of a transparent plate.

6. An apparatus as claimed in claim 3, characterized in that an additional lens system is arranged between the optical system and the sub-object that is most close to the optical system.

* * * * *